Aug. 25, 1959     C. W. COLLIER     2,901,131
SILO UNLOADER
Filed Sept. 21, 1956     2 Sheets-Sheet 1
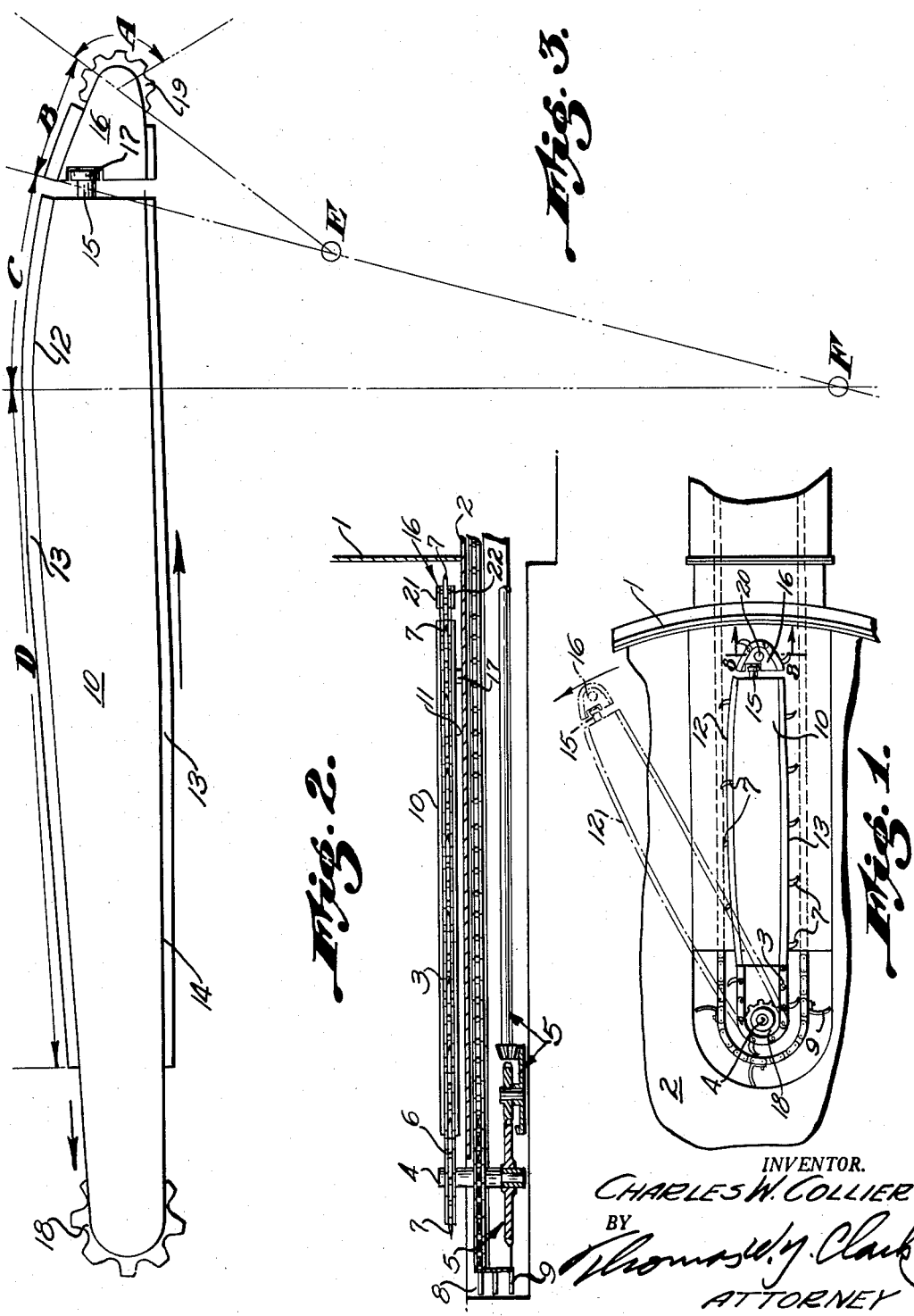
INVENTOR.
CHARLES W. COLLIER
BY Thomas W. J. Clark
ATTORNEY

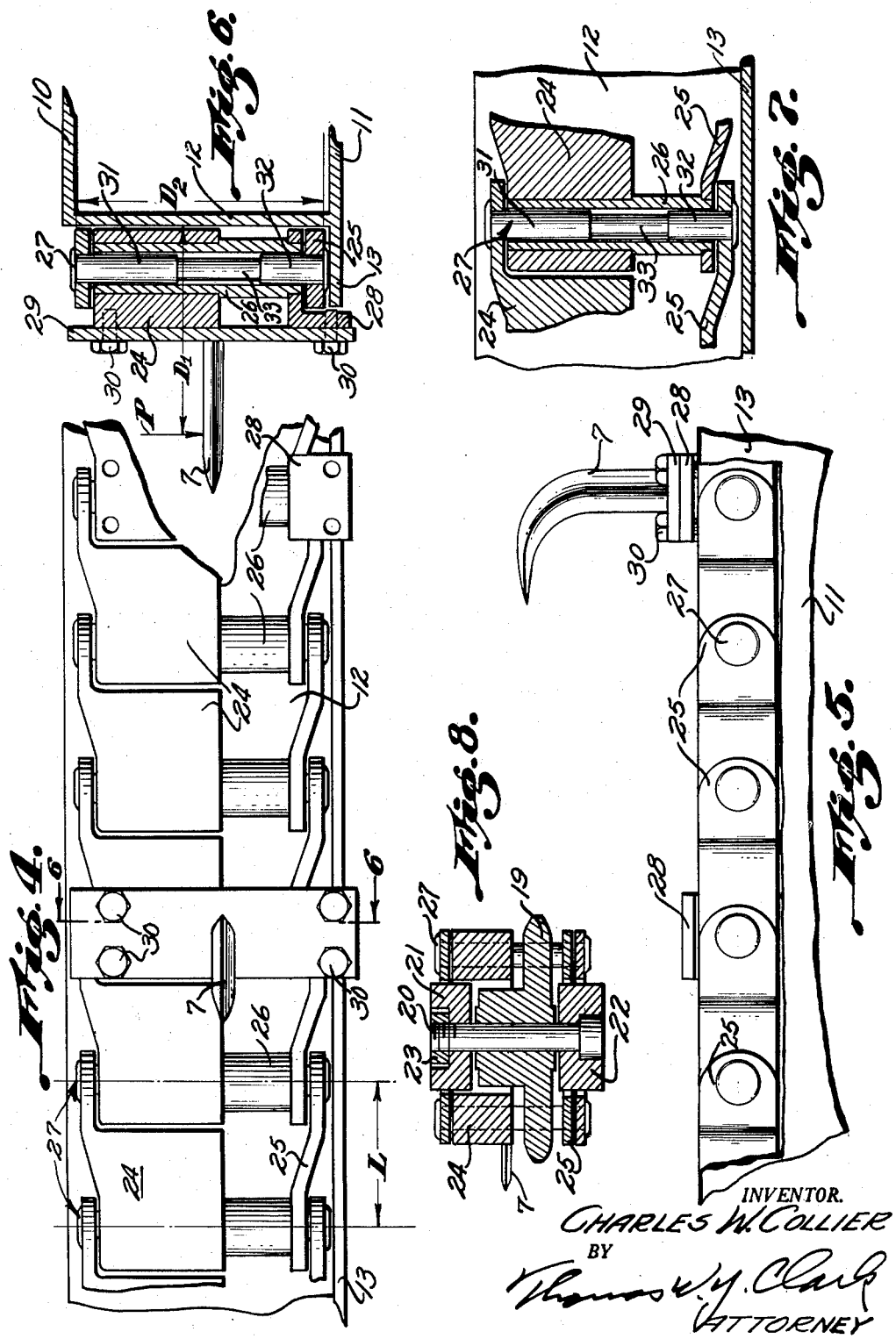

2,901,131

SILO UNLOADER

Charles W. Collier, Darlington, Md.

Application September 21, 1956, Serial No. 611,137

8 Claims. (Cl. 214—17)

This invention relates to an improvement in a mechanism for unloading stored materials such as silage for animals from a storage structure.

The invention may also have application to the cutting or unloading of granular or solid materials which tend to stick together or to become packed, or which impose transverse or twisting movements on the cutting and unloading mechanism. An example of a silo with an unloader operating mechanism is shown in Patent No. 2,675,931.

The objects of the invention are to provide a mechanism for cutting out the materials to be removed of such a design as will resist the vertical twisting forces which cause the conventional mechanisms to become distorted and to be subject to excessive wear and to reduce their cutting and removing efficiency.

One of the current practices in material removal mechanisms is to utilize a series of cutting teeth attached to a conveyor or drive type chain which revolves between sprockets at each end of the cutting and removing arm. When operated in fibrous material or against material which breaks away in hard irregular masses, the cutting teeth attached to the chain are subject to heavy transverse pressures which twist the chain on its axis.

In current practice, the chains utilized are designed to resist tensions operating in the direction of the movement of the chain. The practice is to depend on the tension of the chain to maintain lateral rigidity against twisting forces. However, even when the chain is new and there is no wear in the bearings between the links, extremely high tension is required to maintain a reasonable amount of lateral rigidity. The twisting forces to which the chain is subjected and the high tension at which it operates result in rapid wear of the connecting bearing surfaces, causing them to become ovoid in shape so that in a relatively short period of time, the chain loses its lateral rigidity against twisting, even at the maximum tension which it will sustain.

This invention has several advantages over current practices, among which are the following:

The cutting chain retains its rigidity when under tension irrespective of the degree of wear of the connecting bearing surfaces.

By operating the chain against a curved surface, rigidity of the chain is increased many fold for any degree of tension of the chain, and for this reason the cutting chain can operate at relatively low tension, thus greatly increasing its life.

The use of a relatively wide cutting chain against a curved bearing surface means that when the cutting knives attached to the chain are subject to lateral pressure, the side of the chain away from the source of lateral pressure is pressed against the curved cutting surface and the side of the chain adjacent to the source of lateral pressure is pulled away from the curved cutting surface. Due to the curvature of the curved cutting surface, any movement of any portion of the chain away from the surface is resisted since it would automatically lengthen or throw greater tension upon the chain. For this reason the chain is highly resistant to twisting forces.

In applications where the twisting forces are in a single direction, this combination of chain and curved cutting surface utilizes a chain designed to operate on the driving and driven sprockets in an eccentric position with reference to the sprockets, with the maximum bearing surface of the link connecting bearings located on the upper side of the chain which receives most of the twisting pressure. This side of the chain is stretched by the moment of the twist and operates under the maximum tension, and the eccentricity of the connecting bearings provides maximum wear resistance at the area of maximum wear. In addition, at the point of support by the driving or driven pulley or sprocket, the eccentricity results in a resistance to twist based on the same principle that results in this resistance to twist when the chain is operating against the curved cutting surface. As a consequence of this combination of factors in the cutting chain, of a curved cutting surface or arm, in conjunction with driving and driven sprockets in which the chain can operate at relatively low tension, the chain will have a high resistance to twisting movements, and will retain its rigidity irrespective of wear in the connecting bearing surfaces of the chain.

The material in the silo tends to arch at the center since the material has to be moved a greater distance from the circumference, consequently the greatest downward pressure on the teeth or cutters of the cutting chain is at the swinging or free end, and there the greatest curvature in the bow guide is required to prevent chain twisting. Back of that end, and arch of material, only enough curvature to maintain chain contact with the arm is required. On the backside of the cutting arm, the amount of curvature is very slight. The curvature is continued all the way back to the driving sprocket to prevent silage from being drawn behind the chain.

Other objects and advantages of the invention will be apparent from the following description and the accompanying drawings forming a part thereof and in which:

Figure 1 is a fragmentary top plan view of a silo floor showing the cutting arm of the invention.

..avcurtfc

Figure 2 is a vertical sectional view thereof.

Figure 3 is a top plan view of the cutting arm embodying the invention.

Figure 4 is a front elevational view of a section of the chain on the cutting arm.

Figure 5 is an inverted plan view of a section of the chain.

Figure 6 is a sectional view on line 6—6 of Figure 4.

Figure 7 is a longitudinal sectional view through one joint of the chain.

Figure 8 is a sectional view on line 8—8 of Figure 1.

In the drawings similar numerals refer to similar parts throughout the several views.

The invention is illustrated as a silo unloader and the silo is indicated at 1 and it has a floor 2 at the bottom on which the silage rests. The cutting and gathering arm 3 of this invention is rigidly mounted on pivot shaft 4 centrally of the silo and the arm is driven circularly horizontally counter-clockwise in the silo as illustrated by the arrow in Figure 1, by the shafts and gears 5, and which may be operated generally like that in the above noted patent, this operating means forming no part of the present invention. The cutter and gathering arm 3 has its own cutter carrying chain 6 with cutters 7 and this chain is likewise driven counter-clockwise. It draws the silage to the opening 8 in the floor of the silo where it is drawn by the conveyor 9 from the silo. Sprockets of chain 6 and conveyor 9 are rigidly connected and rotate on shaft 4, conveyor 9 being driven, drives chain 6, The cutter arm 3 is made up of sheet metal and is of generally rectangular cross-sectional configuration, having a top 10 and a bottom 11 and a curved cutting face 12. Flange 13 at the bottom of the arm is continuous with the bottom 11. The arm also has a back 14. A conventional belt tightener 15 joins the end casting 16 of the arm to the main body of the arm. A conventional roller 17 is on the free end of the arm to support it on the silo floor.

Chain 6 rotates around sprocket 18 on vertical shaft 4 and sprocket 19 on shaft 20 in the end 16, shaft 20 passing through the upper and lower sections 21 and 22 of the extension or end 16, and being held therein by a nut 23, the sprocket 18 rotating between these two sections 21 and 22.

The chain 6 bears against the curved front 12 and back 14 of the cutting arm and it is made up of links having a wide blocklike upper section 24 and a lower link section 25 both of which are press fitted on bearing sleeve 26 and at the other end these respective link portions extend vertically over and under the ends of the adjacent link and are press fitted on bearing connecting pin 27 extending through the bearing sleeve 26. The block sections 24 elevate the chain on the sprockets, on which the chain rides eccentrically. On the face of blocklike link section 24 and integral lug 28 of the corresponding lower link is bolted plate 29 by bolts 30 and this plate has cutters or teeth 7 formed thereon. Preferably, the cutter is angled as shown in Figure 5.

The cutter 7 is subjected to pressure from the silage in the silo, and as above stated, this silage tends to arch at the center and rest heavily on the floor at the circumference of the silo. It correspondingly tends to bear hard on the cutters 7 adjacent the end of the cutter arm and spaced slightly back therefrom. This downward pressure tends to pull the chain away from the upper face of the arm 3 and to make it bear heavily against the lower face. The face is preferably slightly wider than the chain. Since the maximum tension on the chain must be on the upper sections of the links these sections are made thicker vertically to resist the wear caused by the tension. Also the upper section 31 of the bearing connecting pin 27 is longer than the lower section 32 of this pin and the pin is cut away at the center section 33. This longer upper bearing section 31 provides longer life for the chain, since greater tension is put on the chain at the top than at the bottom. Since in the normal wearing of the chain, both upper and lower sections tend to wear away, a solid center section for the connecting pin of the same diameter would give an oval shape to the pin and to avoid this oval shape and rocking of the link sections on the pin after it is worn, that center section is removed so that tension can always be placed on the pin ends of the chain throughout the chain's useful life and the chain kept taut at the top especially, as well as at the bottom, by the construction shown. In the event of excessive pressure downwardly on the chain, it would tend to ride on flange 13 but ordinarily the chain would be held up by the sprockets at each end. It will be noted that the sprocket 19 carries the chain spaced from the sections 21 and 22 in ordinary use, but in the event of excessive pressure on the cutters 7 at the end, section 22 will receive the pressure of the lower part of the chain.

The curved cutting arm of Figure 3 illustrates the fact that in this invention any twisting of the chain caused by pressure on the cutters can only be accomplished by stretching the chain. The greater the curvature of the surface 12 of the arm, the greater will be the pressure of the chain against the back 12 for any given chain tension. With appropriate combinations of curvature of the surface 12 and the tension on the chain 6 and the depth or width of the chain, the cutting arm and chain can be adapted to such conditions of downward pressure against the cutter as may be anticipated.

The curvature of the surface 12 may be uniform or it may be varied to provide the greatest resistance to twisting moments at points of greatest vertical strain on the cutters and less resistance at points of lesser strain. Sector A at the very end may be considered the point of greatest strain. At sector B the strain is slightly less. At sector C it is still less and in sector D it is substantially negligible, these variations of strain being caused by the arching of the silage in the silo as above described. The curvature of sector A is determined by the radius of the sprocket 19. The radii of sectors B and C may be calculated by a formula. The approximate center of pressure on the cutter 7 may be designated by point P and the distance from that point to the face of the cutting arm 12 may be designated as $D_1$. The width of the chain may be designated by $D_2$, as shown in Figure 6. The length of a link, between bearing pin 27 centers, may be designated by L. If then it is desired to use a chain of a given width operating at a given tension and subject to a given pressure on the cutters, then the necessary degree of curvature of the arm face 12 is such that when the radii from the centers of curvature, for the sectors B and C are projected through the centers of the connecting pins of a single chain link, the sine of one-half of the included angle between a single chain link shall equal the downward pressure on the cutter times the distance $D_1$ divided by twice the depth or the width of the chain multiplied by the maximum permitted total tension of the top of the chain link. This formula assumes the links of the chain will wear to fit the average curvature of the arm. It ignores the distance from the center of the pin 27 to the face 12 of the arm as insignificant. It also disregards the resistance to twist caused by the pressure of the pins 27 against the flange 13 because this effect will be highly variable depending on the rate and angle of the wear on both pins and flange as well as on the shape of the pin heads and also since in some applications it will be desirable to omit the flange.

In the application of this formula in this invention as shown in Figure 3, the curvature of the arm along arc B was calculated to meet the following requirements:

The downward pressure at P was 25 pounds.

The distance from P to the face of the arm, $D_1$, was 3.7 inches.

The width of the chain $D_2$ was 4.2 inches.

The tension T on the top link of the chain was 200 pounds.

The distance between centers of the link pins 27, L, was 2.5 inches.

The included angle between the pins of each link constitutes a cord X.

The radius of the arm curvature at B may be designated as R.

From the above known constants the length of R may be calculated and the use of the tables in the Architects and Builders Handbook by Kidder-Parker, published by John Wiley & Sons, New York, 18th edition, July 1944, were used.

$$\text{Sine } \frac{x}{2} = \frac{P \times D_1}{D_2 \times 2T} = \frac{25 \times 3.7}{4.2 \times 2 \times 200} = .05506$$

From page 95 of the above book the closest sine to .05506 is .05495 and the table shows an angle of 3° and 9' which equals ½ X. X therefore equals 6° and 18'. The ratio of the cord subtended by a given radius for this angle is, from the table of cords on page 81 of the above book for an angle of 6° and 18'

$$\frac{.1099}{1} = \frac{L}{R} = \frac{2.5}{R}$$

$$R = \frac{2.5}{.1099} = 22.75 \text{ inches}$$

This then would be the radius for arc B from center E. The radius for arc C by similar calculation with pressure $P = 9$ pounds, will be 63.15 inches from a center F.

Arc D has a nominal curvature only sufficient to hold the chain against the arm. Likewise on the back side of the cutting arm the curvature is very slight, being only sufficient to prevent silage from being drawn behind the chain.

While the particular application of this invention utilizes flanges to supplement the inherent stiffness of the chain in preventing vertical chain movement and in transferring twisting moments from the cutting knives to the curved face of the cutting arm, the flanges may be omitted in the case of relatively short arms, in which case the inherent rigidity of the chain design becomes extremely important.

What is claimed as new and is desired to be secured by Letters Patent is:

1. In a storage structure unloader having an arm positioned to swing from one end horizontally around a pivot, sprockets at the arm ends, a vertically extending linked endless chain of substantial width and with pintles parallel to the chain inner face extending peripherally around the arm and sprockets and being under tension to restrain twisting, cutters projecting laterally on the chain, means to rotate the arm and to drive the chain in the direction of arm rotation to pull material toward the pivoted end of the arm as the arm rotates, the arm and cutters in use being under downward pressure of the stored materials, the improvement comprising a vertical chain guide of a depth as great as the chain width and against which the inner face of the linked chain closely rides, the guide supporting the chain and being substantially bowed forwardly between the sprockets on the forward moving side of the arm to supplement the chain tension to restrain the chain from twisting under pressure of the material on the cutters, the degree of curvature in the bow being greatest at the swinging end and decreasing toward the pivotal end of the arm.

2. In a storage structure unloader having an arm positioned to swing from one end horizontally around a pivot, sprockets at the arm ends, a vertically extending endless chain extending peripherally around the arm and sprockets, cutters projecting laterally on the chain, means to rotate the arm and to drive the chain in the direction of arm rotation to pull material toward the pivoted end of the arm, the arm and cutters in use being under downward pressure of the stored materials, the improvement comprising a vertical guide for the chain, the chain having cylindrical bushings on which link side members are press fitted and bearing pins in the bushings press fitted in the adjacent link side members vertically overlapping the bushing held side members, the upper bushing held link comprising a webbed block extending longitudinally along the cylindrical bushing to substantially elevate the chain on the sprockets and increase the wear resistance of the upper side of the chain.

3. In a storage structure unloader having an arm positioned to swing from one end horizontally around a pivot, sprockets at the arm ends, a vertically extending endless chain extending peripherally around the arm and sprockets, cutters projecting laterally on the chain, means to rotate the arm and to drive the chain in the direction of arm rotation to pull material toward the pivoted end of the arm, the arm and cutters in use being under downward pressure of the stored materials, the improvement comprising a vertical guide for the chain, the chain having links of a pair of members press fitted at one end of the members on a cylindrical bushing and at the other end vertically overlapping the tubular bushing and end of the adjacent link, and a bearing pin in the bushing press fitted in the overlapping link ends, the upper tubular press fitted end of each link comprising a webbed block enclosing the cylindrical bushing to space the chain upwardly on the sprockets, the diameter of the bearing pin substantially centrally of the bushing bearing on the sprockets and for substantially only one-third the length of the pin being substantially less than that of the bushing to prevent relative rocking therebetween after wear of the pin and bushing adjacent their ends.

4. In a storage structure unloader having an arm positioned to swing from one end horizontally around a pivot, sprockets at the arm ends, a vertically extending linked endless chain of substantial width and with pintles parallel to the chain inner face extending peripherally around the arm and sprockets and being under tension to restrain twisting, cutters projecting laterally on the chain, means to rotate the arm and to drive the chain in the direction of arm rotation to pull material toward the pivoted end of the arm as the arm rotates, the arm and cutters in use being under downward pressure of the stored materials, the improvement comprising a vertical chain guide of a depth as great as the chain width and against which the inner face of the linked chain closely rides, the guide supporting the chain and being substantially bowed forwardly between the sprockets on the forwardly moving side of the arm, the degree of curvature in the bow being greatest at the swinging end and decreasing toward the pivoted end of the arm, the width of the chain supplementing the bow curvature to restrain the chain from twisting under pressure of the material on the cutters.

5. In a material gathering mechanism having an arm with a mounted end and a free end positioned to swing horizontally under material to be gathered, sprockets at the arm ends, a vertically extending linked endless chain of substantial width and with pintles parallel to the chain inner face extending peripherally around the arm and sprockets and being under tension to restrain twisting, cutters projecting laterally on the chain, means to progress the arm free end under the material and drive the chain to pull material from that under which the arm is progressing toward the mounted end of the arm, the arm and cutters in use being under downward pressure of the material, the improvement comprising a vertical chain guide substantially bowed forwardly on the forwardly moving side of the arm adjacent its swinging end, the guide being substantially as wide as the chain and the width of the chain supplementing the chain guide bowed curvature to restrain the chain from twisting under pressure of the material on the cutters.

6. In a material gathering mechanism having an arm with a mounted end and a free end positioned to swing horizontally under material to be gathered, sprockets at the arm ends, a vertically extending endless chain extending peripherally around the arm and sprockets, cutters projecting laterally on the chain, means to progress the arm free end under the material and drive the chain to pull material toward the mounted end of the arm, the arm and cutters in use being under downward pressure of the material, the improvement comprising a vertical guide for the chain, the chain having links of a pair of members press fitted at one end of the members on a cylindrical bushing and at the other end vertically overlapping the tubular bushing and end of the adjacent link, and a bearing pin in the bushing press fitted in the overlapping link ends, the upper tubular press fitted end of each link comprising a webbed block enclosing the cylindrical bushing to space the chain upwardly on the sprockets, the diameter of the bearing pin substantially centrally of the bushing bearing on the sprockets and for substantially only one-third the length of the pin being substantially less than that of the bushing to prevent relative rocking therebetween after wear of the pin and bushing adjacent their ends.

7. In a material gathering mechanism having an arm with a mounted end and a free end positioned to swing horizontally under material to be gathered, sprockets at the arm ends, a vertically extending endless chain extending peripherally around the arm and sprockets and being under tension to restrain twisting, cutters projecting laterally on the chain, means to progress the arm free end under the material and drive the chain to pull material from that under which the arm is progressing toward the mounted end of the arm, the arm and cutters in use being under downward pressure of the material, the improvement comprising a vertical guide bowed forwardly on the forward moving side of the arm, the guide being substantially as wide as the chain and the width of the chain supplementing the chain guide bowed curvature to restrain the chain from twisting under pressure of the material on the cutters and the chain having cylindrical bushings on which link side members are press fitted and bearing pins in the bushings press fitted in the adjacent link side members vertically overlapping the bushing held side members, the upper bushing held link comprising a webbed block extending longitudinally along the cylindrical bushing to substantially elevate the chain on the sprockets and increase the wear resistance of the upper side of the chain, and the stiffness of the chain to lateral bending.

8. In a material gathering mechanism having an arm with a mounted end and a free end positioned to swing horizontally under material to be gathered, sprockets at the arm ends, a vertically extending endless chain extending peripherally around the arm and sprockets and being under tension to restrain twisting, cutters projecting laterally on the chain, means to progress the arm free end under the material and drive the chain to pull material from that under which the arm is progressing toward the mounted end of the arm, the arm and cutters in use being under downward pressure of the material, the improvement comprising a vertical guide bowed forwardly on the forward moving side of the arm, the guide being substantially as wide as the chain and the width of the chain supplementing the chain guide bowed curvature to restrain the chain from twisting under pressure of the material on the cutters, the chain having links of a pair of members press fitted at one end of the members on a cylindrical bushing and at the other end vertically overlapping the tubular bushing and end of the adjacent link, and a bearing pin in the bushing press fitted in the overlapping link ends, the upper tubular press fitted end of each link comprising a webbed block enclosing the cylindrical bushing to space the chain upwardly on the sprockets, the diameter of the bearing pin substantially centrally of the bushing bearing on the sprockets and for substantially only one-third the length of the pin being substantially less than that of the bushing to prevent relative rocking therebetween after wear of the pin and bushing adjacent their ends.

References Cited in the file of this patent

UNITED STATES PATENTS

| | | |
|---|---|---|
| 594,898 | Palmer | Dec. 7, 1897 |
| 670,285 | Levalley | Mar. 19, 1901 |
| 2,486,618 | Sweeney | Nov. 1, 1949 |
| 2,624,379 | Arneson | Jan. 6, 1953 |
| 2,718,970 | Dueringer | Sept. 27, 1955 |

OTHER REFERENCES

Link Belt Catalog 800, printed May 15, 1939.